United States Patent
Schauer

[11] 3,796,111
[45] Mar. 12, 1974

[54] HYDROMECHANICAL MULTI-RANGE TRANSMISSION

[75] Inventor: George A. Schauer, Belvidere, Ill.

[73] Assignee: Sundstrand Corporation, Rockford, Ill.

[22] Filed: Aug. 18, 1971

[21] Appl. No.: 172,761

[52] U.S. Cl. .................................................. 74/687
[51] Int. Cl. ........................................... F16h 47/04
[58] Field of Search ....................................... 74/687

[56] References Cited
UNITED STATES PATENTS

| | | | |
|---|---|---|---|
| 3,597,997 | 8/1971 | Phillips | 74/687 |
| 3,590,658 | 7/1971 | Tuck | 74/687 |
| 3,626,787 | 12/1971 | Singer | 74/687 |
| 2,808,737 | 10/1957 | Ballard | 74/687 |
| 2,939,342 | 6/1960 | Woydt et al. | 74/687 |
| R27,307 | 3/1972 | DeLalio | 74/687 |
| 3,675,507 | 7/1972 | Takekawa | 74/687 |

Primary Examiner—Benjamin W. Wyche
Assistant Examiner—J. Reep
Attorney, Agent, or Firm—Hofgren, Wegner, Allen, Stellman & McCord

[57] ABSTRACT

A hydromechanical transmission having an input shaft driven mechanical path and an input shaft driven hydraulic drive path with a four element differential for combining torque from the mechanical path and the hydraulic path, the transmission being provided with low and high speed ranges effecting zero to full forward output shaft speeds in both the low and high range, and a reverse in at least one of the speed ranges. The two speed ranges are effected by selectively connecting the third or the fourth control element of the differential to either the mechanical path or the hydraulic path. In one embodiment the third and fourth differential elements are selectively connected to be driven by the hydraulic path with the mechanical path continuously driving one of the differential elements. In another embodiment, the low and high speed ranges are effected by selectively connecting the third and fourth gear elements to the mechanical path with the hydraulic drive continuously drivingly connected to another of the differential elements. Also provided is a common control handle for varying the drive ratio of the hydraulic drive and also the engagement of clutches effecting the low and high speed ranges, with the control consisting of a handle member having two resiliently biased handle bars slidable in a slot with the bars being frictionally held in position within the slot and also locked in recesses in the slot defining zero output shaft speed in each of the low and high speed ranges.

16 Claims, 6 Drawing Figures

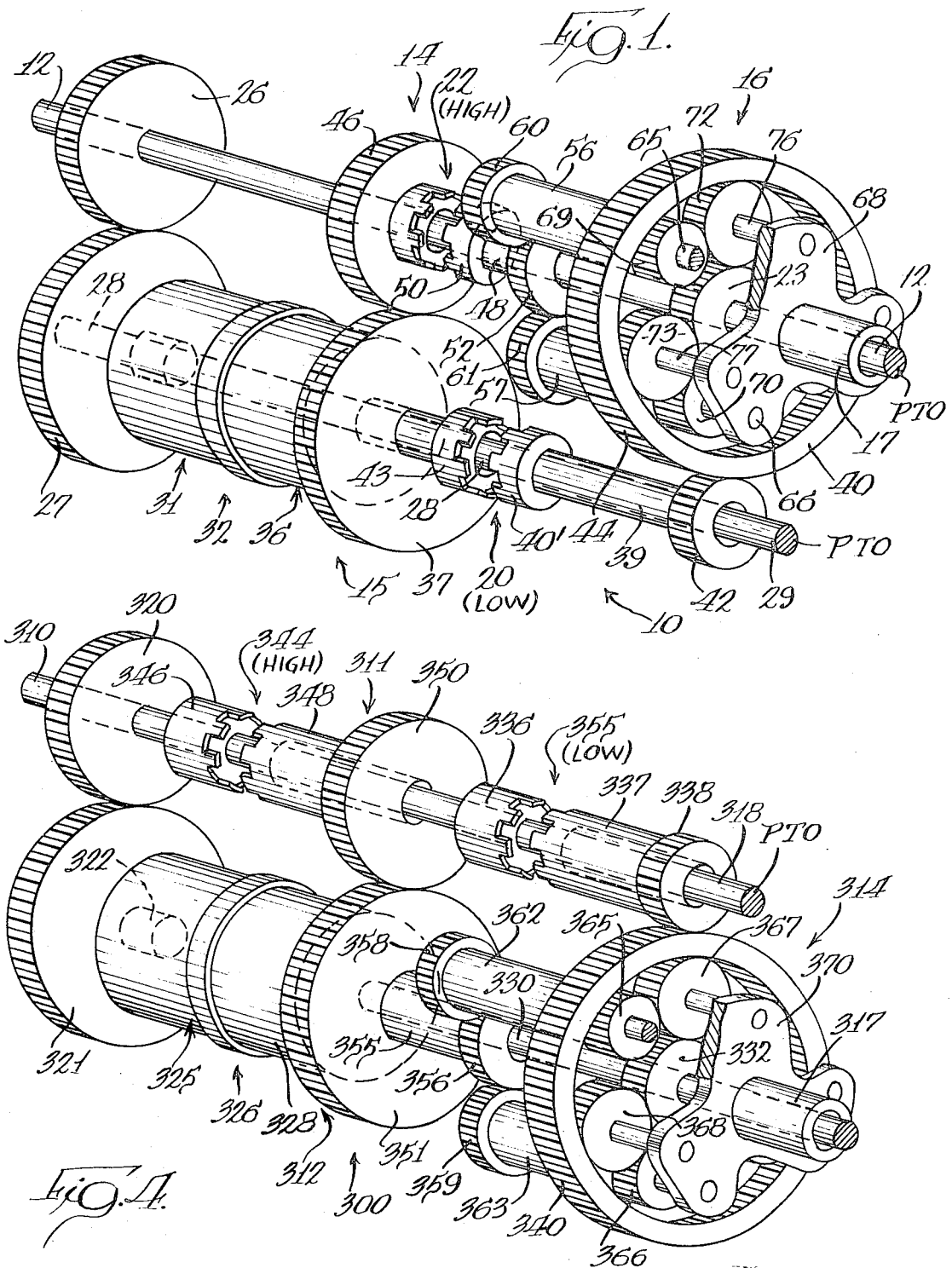

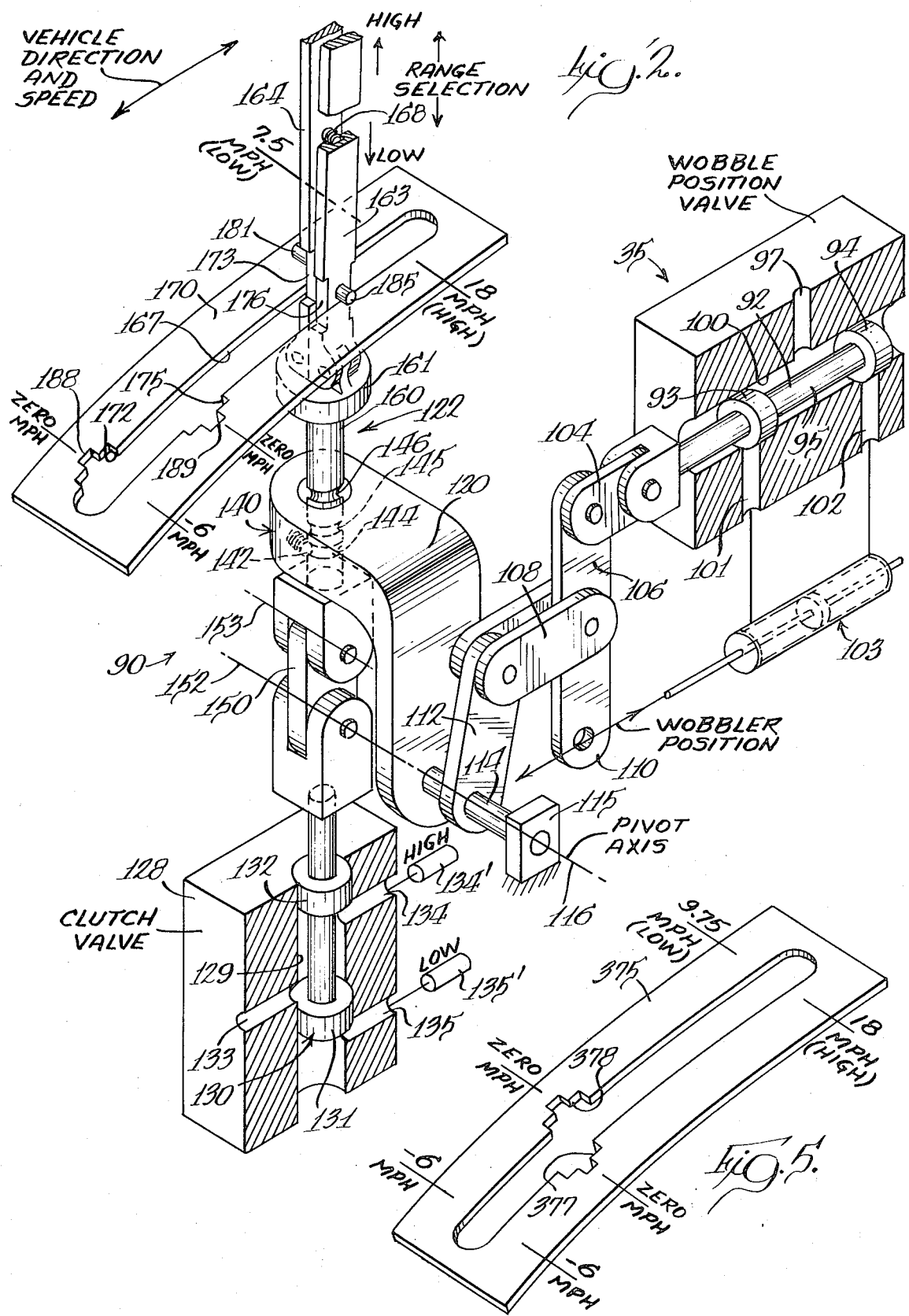

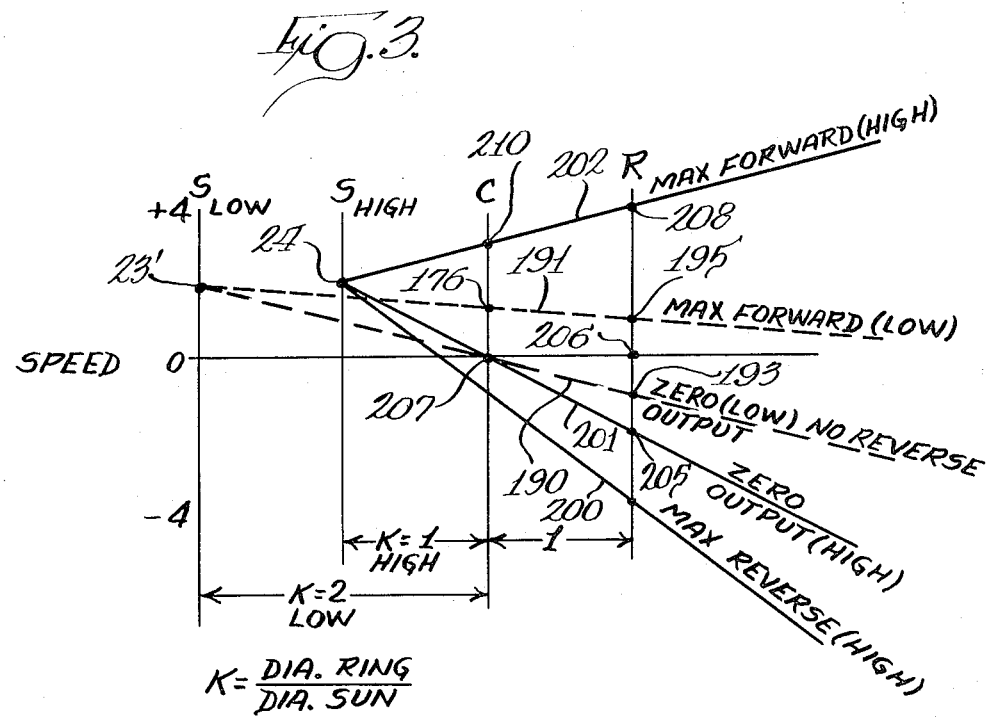
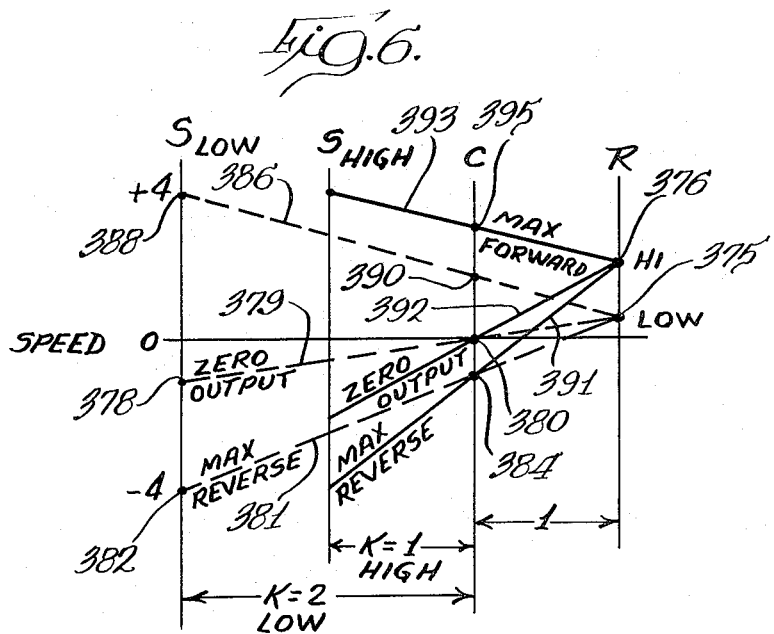

3,796,111

HYDROMECHANICAL MULTI-RANGE TRANSMISSION

BACKGROUND OF THE PRESENT INVENTION

In recent years hydromechanical transmissions have gained considerable acceptance as transmissions for vehicles both of the type adapted to be driven on the road such as semi-tractor-trailer combinations and also of the off-the-road type such as farm tractors and industrial lift trucks, etc.

These transmissions consist basically of an engine driven shaft providing power mechanically split into a mechanical path and a hydraulic path with some form of differential for combining the torque of the two paths. Because of the infinite speed ratio characteristics of hydraulic drives, such as hydrostatic transmissions, the hydromechanical transmission has the advantage of an infinite output speed selection within the total speed range of the transmission, as opposed to a purely mechanical transmission which has a limited plurality of fixed speed ratios.

The mechanical path in hydromechanical transmissions permits, if desired, most of the torque transfer between the input and output shaft to occur through the mechanical leg, which makes use of the characteristic efficiency of mechanical transmissions.

To increase the speed ranges in hydromechanical transmissions various arrangements of clutches and gearing have been provided to effect plural speed ranges for the transmission. One such arrangement includes clutches which disconnect the mechanical path in a low speed mode to provide a low speed straight hydrostatic mode, and clutches to connect the mechanical path in a high speed mode to provide a split path drive. Still other hydromechanical transmissions effect plural speed ranges with additional gearboxes having step-up or step-down gearing along with the associated clutches to effect the selection of gear ranges.

The disadvantage in these prior constructions is that they do not operate at maximum efficiency in both ranges, and they require additional gearing and clutches to effect the plural speed ranges.

It is a primary object of the present invention to overcome or minimize the problems noted above with respect to prior art hydromechanical transmissions.

SUMMARY OF THE PRESENT INVENTION

In accordance with the present invention, a hydromechanical transmission is provided having low and high speed ranges constructed so that in each speed range the power flow is transmitted to both the mechanical and the hydraulic paths. The transmission is capable of a full range of forward speeds from zero to forward maximum in both the low and high speed ranges, and also a range of reverse speeds in at least one of the speed ranges. These features render the present transmission particularly suitable for off-the-road vehicles and equipment such as farm and industrial tractors. The use of split power paths in both the low and high speed ranges increases the overall efficiency of the transmission, while the full range of forward speeds in both modes is desirable in off-the-road equipment.

These objectives are accomplished primarily through the provision of a hydromechanical transmission having an infinitely variable hydraulic path and a mechanical power path combined with a four element output differential. The use of a four element output differential simplifies the clutching and reduces the required gearing to effect the low and high speed ranges.

In one embodiment the low and high speed ranges are effected through the provision of two clutches which selectively connect the third and fourth differential gear elements to the hydraulic drive with another of the differential gear elements being continuously driven by the input shaft. Thus, the low range of the transmission is effected when the hydraulic drive is connected to the third differential element and the high range is effected with the hydraulic drive being connected to the fourth element of the differential, thereby providing a different range of gear ratios in the differential. One of the advantages of this embodiment is that the clutches are located in the hydrostatic power path, as opposed to the mechanical path, thereby reducing the torque requirements of the clutches.

In a second embodiment of the present invention, the low and high speed ranges are effected by selectively clutching the third and fourth gear elements to the input shaft with another of the differential gear elements being continuously driven by the hydraulic drive. Thus, the low speed range is effected by clutching the third differential gear element to the input shaft and the high speed range is effected by clutching the fourth differential gear element to the input shaft. An advantage in this embodiment is that a range of reverse speeds is effected in both the low and high speed ranges.

An additional feature of the present invention, usable with both embodiments of the transmission, is a common control handle for both varying the displacement of the hydraulic drive to effect speed variations, and also to shift the two clutches to select the low or high speed range of the transmission. Toward this end, a handle assembly is provided slidable in an elongated slot. The handle assembly includes two bars biased apart by a spring against the sides of the slot so that the handle may be frictionally retained in any desired position where it is released. Defining the zero output shaft speed positions of the speed ranges are two outwardly extending recesses in the slot. When the handle is placed adjacent the recesses, one of the spring-biased handle bars is urged into the recess locking the transmission in neutral in that range. To effect shifting from one range to another, the handle bars are shifted axially, or transversely with respect to the elongated slot, shifting pins on the handle bars through the plate. In the low range, one of the pins rides on the bottom of the plate, and in the high range, the other of the pins rides on top of the plate and the recesses permit the pins to be shifted from the bottom to the top of the plate. Moreover, the recesses are sized so that the operator must squeeze the handle bars together to permit shifting of the pins through the plate to shift the transmission from one range to the other, and in this manner inadvertent transmission shifting is prevented.

BRIEF DESCRIPTION OF THE DRAWINGS

FIG. 1 is an isometric view of a hydromechanical two-range transmission according to the present invention;

FIG. 2 is a control system for the transmission shown in FIG. 1;

FIG. 3 is a graphic illustration of the speeds of the differential elements in both the low and the high ranges of the FIG. 1 embodiment;

FIG. 4 is an isometric view of another form of hydromechanical transmission according to the present invention;

FIG. 5 is a sub-assembly of a control plate usable with the control system of FIG. 2 to control the transmission illustrated in FIG. 4; and FIG. 6 is a graphic illustration of the speeds of the differential elements in both speed ranges for the hydromechanical transmission illustrated in FIG. 4.

DETAILED DESCRIPTION OF THE PREFERRED EMBODIMENTS

Referring to the drawings and particularly FIG. 1, a hydromechanical transmission 10 is illustrated basically including an input shaft 12, a mechanical power path 14, a hydraulic power path 15, a four-element differential 16 for combining the power flow from the mechanical path 14 and the hydraulic path 15 to drive output shaft 17. A low range clutch 20 when actuated places the transmission in a low speed range, while a high range clutch 22 when actuated places the transmission in a high speed range.

In more detail, the input shaft 12 extends completely through the transmission and projects from the right end thereof from within the output shaft 17 providing an input driven power take-off (PTO) shaft which may be employed to drive auxiliary equipment for the associated vehicle. Fixed to the input shaft 12 is sun gear 23 in the differential so that the sun gear 23 is driven at substantially a constant speed in one direction of rotation. This is true regardless of the mode of the transmission, or more specifically the state of the clutches 20 and 22. As viewed in FIG. 3, in a graph which is sometimes referred to as a nomogram, the sun gear S is seen to rotate at the same speed in both the high and the low modes as indicated by points 23 and 24.

The input shaft 12 drives a gear 26 that meshes with an adjacent gear 27 drivingly connected to a parallel countershaft 28 having an end 29 that may serve as another input power take-off shaft. The shaft 28 is drivingly connected to a variable displacement hydraulic unit 31 of hydrostatic drive 32. The variable displacement unit 31 is conventional in construction and may take the form of a variable displacement multiple axial piston hydraulic unit having a pivotal cam that varies the displacement of the device as desired. As will appear hereinbelow, this cam is controlled by a cam control valve 35 shown in FIG. 2.

The variable unit 31 is connected to deliver fluid relative to a fixed displacement hydraulic unit 36 that is of the same general type as the variable displacement unit 31 except that the displacement thereof is not variable. By positioning the cam control valve 35 in FIG. 2, the displacement of unit 31 is controlled in a manner to infinitely vary the speed of gear 37, driven by the fixed unit 36, relative to gear 27 driven by the input shaft through gear 26. The hydraulic units may be of the type shown in U.S. Pat. Nos. 3,191,543 and 3,249,061, for example.

In the low range of the transmission shown in FIG. 1, the hydraulic drive 32 is connected to drive ring gear 40 in the transmission through clutch 20 (when engaged). Sleeve 39 is driven by clutch member 40' and gear 42 fixed to sleeve 39 is engageable with the gear teeth 44 on the outside of ring gear 40.

In the high speed range of the transmission 10, clutch 20 is disengaged and clutch 22 is engaged providing power flow from the hydraulic drive 32 to the differential 16 through gear 37, gear 46 freely rotatable on shaft 12, clutch 22, sleeve 48 freely rotatable on shaft 12 and driven by clutch member 50, and sun gear 52 (ring-shaped) carried by the sleeve 48.

The sun gear 52 drives a secondary planet system including a plurality of planetary members 56,57 having gears 60,61 engaging the sun gear 52 and freely rotatable on shafts 65,66 carried by planetary gear carrier 68. Planetary members 56,57 have gear teeth 69,70, respectively, that interengage planetary pinions 72,73, respectively. As illustrated in FIG. 1, the planetary pinions 72,73 engage internal teeth on ring gear 40 and are rotatable on shafts 76,77 carried by the planetary gear carrier 68 which is drivingly connected to the output shaft 17.

In this manner, with clutch 22 engaged and clutch 20 disengaged, the hydraulic drive controls the speed of rotation of gear carrier 68 and output shaft 17 by varying the torque applied to the planetary pinion set 72,73 by the other planetary pinion set 56,57.

Thus, the differential 16 is basically a four-element differential consisting of a sun gear 23, a first planetary gear set 72,73 drivingly connected to the output shaft 17 through gear carrier 68, a ring gear 40 and a secondary planetary gear set 56,57. It should be understood that in the embodiment illustrated there are three pinions 56,57 as well as three pinion gears 72,73, although the third gears are not illustrated completely in FIG. 1.

As viewed in FIG. 2, a control 90 is provided for controlling the high or low range of the transmission as well as controlling the speed ratio of the transmission. Toward this end, displacement control valve 35 is provided having a displacement control valve member 92 slidable therein with lands 93 and 94 separated by a reduced stem portion 95. Hydraulic fluid is supplied through port 97 to valve bore 100 selectively to either port 101 or 102 depending upon the displacement of the valve lands 93 and 94. With the valve member 92 shifted to the right pressurizing port 102, a displacement control, diagrammatically shown as a piston and cylinder associated with the cam for the variable displacement unit 31, will be pressurized on the side thereof to move the cam in a direction to cause a positive rotation of ring gear 40 with clutch 20 engaged or alternatively with clutch 22 engaged and clutch 20 disengaged to drive the pinion set 56,57 in a forward direction. Similarly, pressurization of port 101 by shifting valve member 92 to the left causes movement of the cam member toward a direction producing negative rotation of ring gear 40 with clutch 20 engaged, or negative rotation of planetary gear members 56,57 with clutch 22 engaged.

The valve member 92 is controlled by a first link 104 pivotally connected to the valve member and to a second link 106 positioned by an input linkage assembly 108 intermediate of the link 106. The opposite end 110 of the link is positioned in feedback fashion by the cam of hydraulic unit 31 so that the valve 92 is a servo valve, the position of the cam being determined by the position of input linkage 108. Linkage 108 is positioned by a link 112 fixed to a pin 114 pivotable in bearing 115 about stationary axis 116 of rotation and connected to an L-shaped link 120.

The L-shaped link 20 slidably receives a handle 122 so that upon pivotal movement of the handle 122 about axis 116, the valve member 92 may be positioned to effect either forward or reverse displacement in the displacement control cylinder associated with the cam (not shown) in hydraulic unit 31 as desired.

The handle 122 also controls the range of the transmission. Toward this end, valve housing 128 is provided, as shown in FIG. 2, having a valve bore 129 with a valve member 130 slidable therein. Valve member 130 has valve lands 131 and 132 formed integrally therewith.

In the high speed range illustrated in FIG. 2, lands 131 and 132 interconnect a supply passage 133 with a high range passage 134 actuating the clutch 22 through a suitable actuator 134', and deactuating clutch 20 which is actuated by the pressurization of port 135. Upon downward shifting of the valve 130, valve lands 131 and 132 connect the low range port 135 to supply port 133 and connect high range port 134 to drain, thereby actuating the low range clutch 20 through actuator 135' and deactuating the high range clutch 22. In an intermediate position of valve member 130, pressure port 133 is blocked from both clutch ports 134 and 135, and the latter are connected to drain.

For the purpose of retaining valve member 130 in neutral, high mode, or low mode, a detent assembly 140 is provided in link 120. The detent assembly 140 includes a spring-biased ball 142 in link 120 selectively engageable with recesses 144, 145 or 146 on handle rod 160 to locate the handle assembly 122 in, respectively, a high speed range, neutral, or a low speed range. The detent assembly 140 serves to hold the valve member in each of its three positions.

Valve member 130 is interconnected to the handle assembly 122 by a link 150 pivotally connected about axis 152 to valve member 130 and pivotally connected to handle 122 about axis 153. When the handle 122 is in its low range position, axis 153 is coincident with axis 116 of the displacement control, and conversely when the handle 122 is in the high range illustrated, axis 152 is coincident with axis 116 to permit the free pivotal movement of handle 122 without any sliding movement with respect to link 120.

The handle assembly 122 includes a rod 160 having an enlarged portion 161 carrying pivotally mounted bars 163 and 164 biased apart by a spring member 168. The bars 163, 164 are slidable in an elongated slot 167 in guide plate 170.

The spring 168 urges the bars 163 and 164 outwardly against the edges of slot 167 to retain the handle 122 in any desired position and thus maintains the transmission ratio selected by the operator.

The slot 167 has a first recess 172 which receives a reduced portion 173 on bar 164 when adjacent thereto to automatically lock and hold the control handle 122 in neutral in the low range, since spring 168 urges bar members 163 and 164 apart. It is then required that the operator squeeze the handle bars 163 and 164 together to vary the transmission ratio in a forward direction in the low range. Note that in the embodiment shown in FIG. 1, the transmission is constructed such that in the low range, the ring gear 40 cannot rotate at a sufficient speed in a reverse or negative direction to produce a negative output from output shaft 17.

A second recess 175 is provided for receiving a reduced portion 176 in handle bar 163 to receive and hold the control handle in neutral in the high range. The recesses 172 and 173 are positioned such that the effective displacement of the variable unit 31 will cause zero transmission output when the handle assembly is adjacent to the respective recesses.

A first upper pin 181 projects from bar 164 for the purpose of riding on the lower surface of the plate 170 to vary the speed ratio of the transmission in the low range. Similarly, a pin 185, somewhat below the pin 181, extends outwardly from handle bar 163 and rides on the upper surface of plate 170 in the high range of the transmission to vary the transmission ratio. Recesses 188 and 189, extending from recesses 172 and 175, respectively, permit the pins 181 and 185 to pass through the plate 170 when the handle portions 163 and 164 are moved toward each other.

In operation of the control shown in FIG. 2, assume initially that the transmission is to be operated in the high range set by the location of handle 122, as shown, with pin 185 on the top of the plate 170. With the handle disposed to locate pin 185 at recess 189, the handle may be moved up to the position shown, so that the valve member 130 is in its upper position pressurizing port 134 and placing the transmission in its high range drive with clutch 22 engaged and clutch 20 disengaged. When the handle is adjacent recess 189, gears 46 and 52 rotate at the same speed, and the elements of clutch 22 may thus be engaged synchronously. The speed ratio of the transmission may thus be varied by pivoting handle 122 about axis 152, as desired, to the right of recess 175, driving the vehicle in a forward high range. When it is desired to place the transmission in neutral in the high speed range, the handle assembly 122 is moved adjacent recess 175 where handle bar 163 automatically moves into the recess 175 under the influence of spring 168 locking the handle in its neutral position arresting movement of the vehicle in the high speed range. To place the transmission in the reverse mode of the high speed range, handle members 163 and 164 are squeezed together, and handle 122 pivoted further counterclockwise about pivot 152 varying the displacement of the cam associated with unit 31 to reverse the output of the transmission.

To effect a change in speed range, the transmission is placed in neutral high range, arresting the vehicle with the bar 163 in recess 175, and thereafter the operator shifts the handle assembly 122 downwardly passing pin 185 through recess 189 and at the same time rotating the control handle 122 within the slot 167 with pin 181 above the plate and pin 185 below the plate. This positions the ports 134 and 135 so that they both communicate with drain, disengaging both clutches 20 and 22. At this time, ball detent 142 is engaged in neutral recess 145.

When the handle 122 is adjacent slot 172, the ratio of transmission 32 is such that the gear 37 and clutch member 43 are rotating at a synchronous speed with clutch member 40' with the output shaft 17 stationary. Clutch 20 is engaged when the operator further depresses handle 122 passing pin 181 through the recess 188 which moves the ball detent assembly 140 into the recess 146, thereby placing valve 130 in the low range. This engages clutch 20 synchronously.

Handle assembly 122 may then be pivoted about pivot 153 in a clockwise direction shown in FIG. 2 effecting transmission output in a forward direction in the low range. Movement of the handle back to recess 172 will cause lever 164 to lock in the recess under the influence of spring 168.

The relative direction and magnitude of gear rotation of differential 16 may be viewed by the nomogram of FIG. 3. In this FIG., the vertical lines S,S represent the speed of the sun gear 23 in both the low and high mode, and points 23' and 24 indicate the continuously positive rotation of the sun gear 23. Vertical line C represents the speed and direction of rotation of the carrier 68 and the output shaft 17. Vertical line R represents the speed and direction of rotation of the ring gear 40 in the low mode or the ring-shaped sun gear 52 in the high range. It should be noted that K represents the ratio of the diameter of the ring gear to the diameter of the sun gear which as illustrated is equal to two in the low mode and one in the high mode, since ring gear 40 in the low mode provides a greater effective diameter than gear 52 in the high mode.

The dotted lines 190 and 191 represent the speed of the gears in the differential 16 in the low range at, respectively, zero output speed of shaft 17, and maximum forward output speed of output shaft 17. For example, to effect a zero output speed in the low mode with clutch 20 engaged, the ring gear 40 must rotate in a negative direction at a speed indicated by point 193 on line R. With control handle 122 in its maximum forward position, ring gear 40 will rotate in a forward direction at a speed indicated by point 195, driving the carrier and output shaft 17 at a speed in a forward direction indicated by point 196. Thus, it is seen that the ring gear 40 in the low range rotates in both a negative direction and a positive direction to achieve a forward direction of rotation of output shaft 17. It should be understood for a full understanding of the nomogram of FIG. 3 that any line may be drawn through point 23' between the lines 190 and 191 to determine the speed of the carrier and output shaft 17 for a given speed of the ring gear 40.

Similar lines 200, 201 and 202 may be drawn for the high range in which clutch 22 is engaged. The lines 200, 201 and 202 represent, respectively, the maximum reverse, zero output, and maximum forward lines, and where they cross each of the lines S, C and R represents the speed of the gears in these states. The S line associated with the high range is closer to the C and R lines because K is one-half of that in the low mode. It should be understood that R in the high mode represents the speed of the sun gear 52 and not the ring gear 40. With the control handle 122 in its zero output high mode position, the cam associated with hydraulic unit 31 rotates the planet set 56,57 in the negative direction indicated at point 205 sufficiently to cause zero output from the transmission as indicated at point 207. Movement of the control handle 122 in a clockwise direction in the high range decreases the speed of rotation of pinion members 56,57 and at point 206 indicated on FIG. 3, the pinion members 56,57 reverse rotation and continue to add speed to the differential as the cam is moved overcenter in a forward direction. At the maximum forward displacement of hydraulic unit 31, the pinion members 56,57 will be rotating at a speed indicated at a point 208 providing a maximum output speed of output shaft 17 as represented by point 210 on line C. shown in FIG. 4 of this embodiment, it is seen to be generally similar to the embodiment shown in FIG. 1 except that the dual speed range is effective through the mechanical path rather than the hydraulic path. In FIG. 4, a hydromechanical transmission 300 is seen to consist generally of an input shaft 310, a mechanical path 311, a hydraulic path 312, and a differential 314 for combining the torques of the hydraulic and mechanical paths 321 and 311 and driving the output shaft 317. The input shaft 310 extends entirely through the mechanical path 311 and provides a power take-off shaft (PTO) 318 at the output side of the transmission where it may be used to drive auxiliary equipment.

The hydraulic path 312 includes a gear 320 fixed to the input shaft 310 and driving a gear 321 on a countershaft 322 which, in turn, drives a variable displacement hydraulic unit 325 associated with a hydraulic drive 326.

The hydraulic drive 326 includes a fixed displacement unit 328. The hydraulic units 322 and 326 may be identical with hydraulic units 31 and 35 described with respect to the FIG. 1 embodiment.

The hydraulic unit 328 is connected to continuously drive shaft 330 connected to continuously drive sun gear 332 in differential 314. Thus, in this embodiment, it is seen that the hydraulic drive is drivingly connected to the sun gear, as opposed to the mechanical path being connected to the sun gear as in the FIG. 1 embodiment.

For the purpose of effecting a low speed range, a low range clutch 335 is provided including a clutch member 336 fixed to input shaft 310 and a clutch sleeve 337 rotatable on shaft 310 and carrying gear 338 at the right end thereof interengaging external teeth on ring gear 340. Clutch member 336 is axially slidable on shaft 310 to engage the opposing clutch member and connect the ring gear 340 to the input shaft 310 in the low range when the clutch members 336 and 337 rotate synchronously.

To effect the high speed range of the transmission 300, a high range clutch 344 is provided having a first clutch member 346 rotatably fixed to the input shaft 310 but axially slidable with respect thereto, and clutch sleeve 348 opposing the same and being freely rotatable on the shaft 310. Sleeve 348 is fixed to gear 350 which interengages gear 351 freely rotatable on shaft 330 and drivingly connected to sleeve 355 carrying a secondary sun gear 356 on its right end. Clutch members 346 and 348 are engaged while rotating synchronously.

Sun gear 356 (ring-shaped) interengages gears 358 and 359 on secondary pinion members 362 and 363 respectively, identical in construction to pinion members 56 and 57 in the FIG. 1 embodiment. Pinion members 362 and 363 have gears 365 and 366 on the right ends thereof interengaging another set of planetary pinions 367 and 368 in turn interengaging both the sun gear 332 and internal teeth on the ring gear 340, in the same manner as the FIG. 1 embodiment. Both pinion sets are carried by a planetary gear carrier 370 which is drivingly connected to output shaft 317.

The transmission 300 of FIG. 4 is controlled by the same control shown in FIG. 2 with the substitution of control plate 375 shown in FIG. 5 for the control plate 170. The high range zero recess 377 is at approximately the same position as recess 175 and thus the displacement of hydraulic unit 325 at high range zero output is approximately the same as in the FIG. 1 construction. However, the low range zero output recess 378 is spaced considerably upwardly from recess 172 so that zero output in the low mode in the FIG. 4 construction occurs in a much lower negative displacement of the hydraulic unit 325 than in the FIG. 1 embodiment, as represented by control plate 170. One of the basic differences between the two embodiments exemplified by this construction is that in the low range, the handle 122 may be rotated in a counterclockwise direction increasing the negative displacement of the hydraulic unit 325 and providing a full range of reverse speeds in the low mode.

The direction of gear rotation and speeds of the gears in the differential 314 may be seen in the nomogram of FIG. 6. The gearing geometry in the differential 314 is the same as the differential 16 as represented by the fact that K is one in the high mode and two in the low mode in both embodiments. Thus, the gear ratios in the differential are the same in both constructions, but because of the low and high range clutches being placed in the mechanical path rather than the hydraulic path, a somewhat different nomogram results. In this curve, it is seen that the ring gear 340 rotates at a constant speed in a somewhat forward direction in the low mode as represented by point 375. Similarly, in the high range, the gear 356 is driven at a constant speed at a faster rate as represented by point 376 on line R. Again, however, point 375 represents the speed of ring gear 340 while point 376 represents the speed of the secondary sun gear 356. In neutral in the low range, the displacement of hydraulic unit 325 is sufficiently negative to produce a somewhat negative rotation of the sun gear 332 as represented by point 378. The zero low mode line 379 thus intersects the vertical line C at point 380 representing a zero output of carrier 370 and output shaft 317. Maximum reverse line 381 is provided with the cam associated with hydraulic unit 325 in its maximum reverse position rotating the sun gear at a speed indicated at point 382 which rotates the carrier 370 in a reverse direction as indicated by point 384.

Maximum forward is illustrated by line 386 where the hydraulic unit 325 is placed in its maximum forward displacement position rotating sun gear 332 in a forward direction at a speed indicated by point 388. This produces a forward rotation of the carrier and output shaft 317 indicated at point 390.

Similar lines are shown for the high mode including maximum reverse line 391, zero output line 392 and maximum forward line 393. Note that the speed ranges of the sun gear in both the high and low modes are equal as indicated by the ends of the maximum forward and maximum reverse lines and the S lines. This results from the fact that the sun gear 332 has the same range of speeds in both the high and low modes since it is rotated by the hydraulic drive 326. Because of the difference in K, however, the maximum speed forward in the high range indicated by point 395 is greater than in the low range indicated by point 390.

An important advantage of the transmission in both embodiments herein resides in the provision for varying the speed range in the differential which combines hydraulic and mechanical power, because such arrangement produces different gear ratios for each range, as represented by K, which result in speed ranges of different characteristics. For example, in FIGS. 1, 2 and 3, the low range has only a forward speed, whereas the high range has forward and reverse. In FIGS. 4, 5, and 6, both ranges have forward and reverse, but the forward and reverse speeds are not proportional in the two ranges. Thus, the transmission is very versatile, in contrast to a hydromechanical transmission with change speed gearing in the output train, for example, where the two speed ranges would have similar characteristics with the same percentages devoted to forward and reverse directions in both ranges.

I claim:

1. A hydromechanical transmission, comprising; an input shaft member, an output shaft, a hydraulic drive driven by said input shaft member, a shaft member driven by said hydraulic drive, a differential mechanism including first gear means drivingly connected to one of said shaft members, second gear means drivingly connected to the output shaft, third gear means controlling the relative rotation of the first and second gear means, fourth gear means controlling the relative rotation of the first and second gear means, means providing alternative speed ranges having different maximum output shaft speeds including first and second clutch means for selectively connecting the other shaft member to the third gear means or the fourth gear means, and means for varying the drive ratio of the hydraulic drive to vary the speed of the output shaft from maximum to zero with either clutch means engaged and with the input shaft rotating.

2. A hydromechanical transmission as defined in claim 1, wherein said hydraulic drive includes a pump, a motor, and control means for varying the displacement of one of said pump or motor.

3. A hydromechanical transmission as defined in claim 2, wherein said control means includes means for indicating the displacement corresponding to zero output shaft speed in both ranges of the transmission.

4. A hydromechanical transmission comprising; an input shaft member, an output shaft, a hydraulic drive driven by said input shaft, a shaft member driven by said hydraulic drive, means for varying the drive ratio of the hydraulic drive, a differential mechanism including first gear means drivingly connected to one of said shaft members, second gear means drivingly connected to the output shaft, third gear means controlling the relative rotation of the first and second gear means, fourth gear means controlling the relative rotation of the first and second gear means, and means providing plural speed ranges for said transmission including means selectively connecting the other shaft member to the third gear means or the fourth gear means, wherein said first gear means is a sun gear, said second gear means being a gear carrier having pinions interengaging said sun gear, said third gear means being a ring gear interengaging said pinions, said fourth gear means being a second set of planetary pinions driven with said gear carrier, said second set of pinions being drivingly connected to said first set of pinions.

5. A hydromechanical transmission as defined in claim 4, wherein said means providing plural speed ranges includes a first clutch selectively connecting said other shaft member to said ring gear, a second clutch selectively connecting said other shaft member to said second set of pinions, and control means for engaging said first clutch and simultaneously disengaging said second clutch and for disengaging said first clutch and simultaneously engaging said second clutch.

6. A hydromechanical transmission as defined in claim 5, wherein said control means includes a common control handle for controlling said displacement varying means and said first and second clutches.

7. A hydromechanical transmission as defined in claim 6, wherein said control handle is movable in a first direction to control said displacement varying means and a second direction generally transverse to said first direction for controlling said first and second clutches, said handle being slidable in a slot, said handle including a pair of parallel, pivotal handle bars, and means biasing said bars into engagement with said slot to frictionally retain the handle in its preset position.

8. A hydromechanical transmission as defined in claim 1, wherein the hydraulic drive comprises a pump and a motor connected in closed hydraulic circuit, and the means for varying the drive ratio comprises means for varying the displacement of the pump to vary the speed of the output shaft in opposite directions from zero in both speed ranges.

9. A hydromechanical transmission, comprising; an input shaft, an output shaft, a hydraulic drive driven by said input shaft, a differential for combining hydraulic and mechanical torque in the transmission including first gear means drivingly connected to said input shaft, second gear means drivingly connected to said output shaft, third gear means for controlling the relative rotation of said first and second gear means, and fourth gear means for controlling the relative rotation of the first and second gear means, means for providing two alternative speed ranges having different maximum output shaft speeds including a first clutch for selectively connecting said hydraulic drive to drive said third gear means, a second clutch for selectively connecting the hydraulic drive to drive the fourth gear means, control means for engaging said first clutch and substantially simultaneously disengaging said second clutch and for disengaging said first clutch and substantially simultaneously engaging said second clutch, and means for varying the drive ratio of the hydraulic drive to vary the speed of the output shaft from maximum to zero with either clutch engaged and with the input shaft rotating.

10. A hydromechanical transmission comprising; an input shaft, an output shaft, a hydraulic drive driven by said input shaft, means for varying the drive ratio of the hydraulic drive, a differential for combining hydraulic and mechanical torque in the transmission including first gear means drivingly connected to said input shaft, second gear means drivingly connected to said output shaft, third gear means for controlling the relative rotation of said first and second gear means, and fourth gear means for controlling the relative rotation of the first and second gear means, means for providing two speed ranges for the transmission including a first clutch selectively connecting said hydraulic drive to drive said third gear means, a second clutch selectively connecting the hydraulic drive to drive the fourth gear means, and control means for engaging said first clutch and substantially simultaneously disengaging said second clutch and for disengaging said first clutch and substantially simultaneously engaging said second clutch, wherein said first gear means is a sun gear drivingly connected to the input shaft, said second gear means being a gear carrier and planet pinion assembly drivingly connected to the output shaft, said third gear means being a ring gear, and said fourth gear means being a second set of planetary pinions carried by said carrier.

11. A hydromechanical transmission as defined in claim 9, wherein said input shaft and differential are disposed on a common axis, said hydraulic drive including back-to-back hydraulic units mounted for rotation on an axis parallel to and adjacent said first axis.

12. A hydromechanical transmission, comprising; an input shaft, an output shaft, a hydraulic drive driven by said input shaft, a planetary gear mechanism for combining torques from said input shaft and said hydraulic drive including first gear means drivingly connected to the hydraulic drive, second gear means drivingly connected to the output shaft, third gear means controlling the relative speed of the first gear means and the second gear means, and fourth gear means controlling the relative speed of the first gear means and the second gear means, means for providing alternative speed ranges having different maximum output shaft speeds including a first clutch for selectively connecting said input shaft to drive the third gear means, a second clutch for selectively connecting said input shaft to drive the fourth gear means, control means for engaging said first clutch and substantially simultaneously disengaging said second clutch, and for disengaging said first clutch and substantially simultaneously engaging said second clutch, and means for varying the drive ratio of the hydraulic drive to vary the speed of the output shaft from maximum to zero with either clutch engaged and with the input shaft rotating.

13. A hydromechanical transmission, comprising; an input shaft, an output shaft, a hydraulic drive driven by said input shaft, means for varying the drive ratio of the hydraulic drive, a planetary gear mechanism for combining torques from said input shaft and said hydraulic drive including first gear means drivingly connected to the hydraulic drive, second gear means drivingly connected to the output shaft, third gear means controlling the relative speed of the first gear means and the second gear means, and fourth gear means controlling the relative speed of the first gear means and the second gear means, means for providing plural speed ranges for the transmission including a first clutch selectively connecting said input shaft to drive the third gear means, a second clutch selectively connecting said input shaft to drive the fourth gear means, and control means for engaging said first clutch and substantially simultaneously disengaging said second clutch, and for disengaging said first clutch and substantially simultaneously engaging said second clutch, wherein said first gear means is a sun gear drivingly connected to said hydraulic drive, said second gear means being a gear carrier and pinion combination drivingly connected to said output shaft, said third gear means being a ring gear, and said fourth gear means being a second set of planetary pinions carried by said gear carrier.

14. A hydromechanical transmission as defined in claim 12, said input shaft being located on a first axis, said hydraulic drive and differential mechanism being disposed on a common axis parallel with said first axis.

15. A hydromechanical transmission as defined in claim 1, wherein the hydraulic drive comprises a pump and a motor connected in closed hydraulic circuit, and the means for varying the drive ratio comprises means for varying the displacement of the pump to vary the speed of the output shaft in opposite directions from zero in at least one speed range.

16. A hydromechanical transmission as defined in claim 8, wherein the third and fourth gear means provide different gear ratios in the differential mechanism which produce different speed ranges having different proportions thereof devoted to forward and reverse direction.

* * * * *